(12) United States Patent
Gibson

(10) Patent No.: US 8,681,630 B1
(45) Date of Patent: Mar. 25, 2014

(54) CONFIGURABLE RATE LIMITING USING STATIC TOKEN BUCKETS, AND APPLICATIONS THEREOF

(75) Inventor: David Gibson, Mountain View, CA (US)

(73) Assignee: Google Inc., Mountain View, CA (US)

(*) Notice: Subject to any disclaimer, the term of this patent is extended or adjusted under 35 U.S.C. 154(b) by 178 days.

(21) Appl. No.: 13/229,280

(22) Filed: Sep. 9, 2011

Related U.S. Application Data

(60) Provisional application No. 61/385,018, filed on Sep. 21, 2010.

(51) Int. Cl.
*H04L 12/26* (2006.01)

(52) U.S. Cl.
USPC ......................................................... 370/235

(58) Field of Classification Search
None
See application file for complete search history.

(56) References Cited

U.S. PATENT DOCUMENTS

| | | | |
|---|---|---|---|
| 2008/0209451 A1* | 8/2008 | Michels et al. | 719/328 |
| 2010/0205243 A1* | 8/2010 | Brady | 709/203 |

* cited by examiner

*Primary Examiner* — Minh-Trang Nguyen
(74) *Attorney, Agent, or Firm* — Birch, Stewart, Kolasch & Birch, LLP

(57) ABSTRACT

A system disclosed rate limits API requests. The system includes an API server that receives an API request from a developer application at an API server and a token bucket to rate limit API requests from the developer application. A token query translation module determines a number of tokens needed to process the API request based on a rate configured in predefined policy data for the developer application and a replenish rate of the token bucket. The number of tokens inversely corresponds to the rate configured in the predefined policy data. A token request module instructs the API server to process the API request if the token bucket has sufficient tokens and reduces the number of tokens in the token bucket for the developer application by the number of tokens needed to process the API request. In this way, the disclosed system effectively simulates buckets having configurable replenish rates.

20 Claims, 6 Drawing Sheets

CONFIGURABLE RATE LIMITING USING STATIC TOKEN BUCKETS, AND APPLICATIONS THEREOF

This nonprovisional application claims priority to U.S. Provisional Patent Application No. 61/385,018 filed Sep. 21, 2010, which is incorporated herein by reference in its entirety.

BACKGROUND

1. Field

This field is generally related to rate limiting.

2. Related Art

Servers provide application programming interfaces (APIs) available to software program code written by external developers, often over one or more networks such as the Internet. These servers may receive a request, such as a web service request, from a developer application and provide a response to the request. Example services available through network APIs include returning search results and translating between languages.

If developer applications send too many API requests, the API servers may be overwhelmed. For this reason, API service providers generally limit the rate at which a developer application can use an API. Verifying that an application's limit has not been exceeded generally must occur before an API request is processed. Thus, if this verification is not conducted rapidly, the API server's response time may be unacceptably slowed.

To enforce rate limits, many API service providers use token bucket algorithms. As an example, a token bucket algorithm may operate as follows to limit the number of requests processed each second. The token bucket algorithm maintains a bucket that includes between 0 and Y tokens. Every second, the algorithm may add X tokens (referred to herein as the replenish rate) back to the bucket, capping the number of tokens at Y. Every time a request is made, an attempt is made to remove a token from the bucket. If the bucket only includes zero tokens, the request is denied. The maximum request rate may be altered by changing the X and Y values. In this way, the token bucket algorithm may limit the number of requests from developer applications over a time period.

BRIEF SUMMARY

Embodiments enable configurable rate limiting of API accesses using static token buckets. In a first embodiment, a computer-implemented method rate limits API requests. In the method, an API request is received at an API server from a developer application. A number of tokens needed to process the API request is determined based on a rate configured in predefined policy data for the developer application and a replenish rate of a token bucket to rate limit API requests from the developer application. The number of tokens inversely corresponds to the rate configured in the predefined policy data. In response to receipt of the API request, a number of tokens in the token bucket for the developer application is reduced by the number of tokens needed to process the API request. Also, if a number of tokens in the token bucket for the developer application exceeds the number of tokens needed to process the API request, the API request is processed to return a response to the API request to the developer application In a second embodiment, a system rate limits API requests. The system includes an API server that receives an API request from a developer application. The system further includes a token bucket to rate limit API requests from the developer application. A token query translation module determines a number of tokens needed to process the API request based on a rate configured in predefined policy data for the developer application and a replenish rate of the token bucket. The number of tokens inversely corresponds to the rate configured in the predefined policy data. A token request module instructs the API server to process the API request if a number of tokens in the token bucket for the developer application exceeds the number of tokens needed to process the request. The token request module also reduces the number of tokens in the token bucket for the developer application by the number of tokens needed to process the API request.

In a third embodiment, a computer-implemented method rate limits API requests. In the method, a first API request is received from a developer application at an API server. A first number of tokens needed to process the API request is determined based on a rate configured in predefined policy data for the developer application and a replenish rate of a token bucket to rate limit API requests from the developer application. The number of tokens inversely corresponds to the rate configured in the predefined policy data. In response to receipt of the API request, if a number of tokens in the token bucket for the developer application exceeds the first number of tokens needed to process the first API request, the first API request is processed to return a response to the first API request to the developer application. Also, the number of tokens in the token bucket for the developer application is reduced by the first number of tokens needed to process the API request. The rate configured in the predefined policy data for the developer application is altered. A second API request is received from the developer application. A second number of tokens needed to process the second API request is determined based on the altered rate and the replenish rate of the token bucket. The second number of tokens differs from the first number of tokens and inversely corresponding to the altered rate. In response to the second API request, if the number of tokens in the token bucket for the developer application exceeds the second number of tokens needed to process the request determined, the second API request is processed to return a result of the second API request to the developer application. Also, the number of tokens is reduced in the token bucket for the developer application by the second number of tokens.

In a fourth embodiment, a system rate limits API requests. The system includes an API server that receives an API request from a developer application. A token query translation module determines a number of tokens needed to process the API request based on a rate configured in predefined policy data for the developer application and a replenish rate of a token bucket. The number of tokens inversely corresponds to the rate configured in the predefined policy data. The token query translation module also sends a token request including the number of tokens to a token bucket server that returns whether the token bucket has greater than the determined number of tokens. The API server processes the API request to return a response to the API request to the developer application if the token bucket server indicates that the token bucket has greater than the determined number of tokens.

In a fifth embodiment, a system rate limits network requests. In the method, a request is receiving at a server from a developer application via a network. A number of tokens needed to process the request is determined based on a rate configured in predefined policy data for the developer application and a replenish rate of a token bucket to rate limit requests from the developer application. The number of tokens inversely corresponds to the rate configured in the predefined policy data. In response to receipt of the request, a number of tokens in the token bucket for the developer application is reduced by the number of tokens needed to process the request determined. Also, if the number of tokens in the token bucket for the developer application exceeds the number of tokens needed to process the request, the request is processed to return a response to the request to the developer application.

In this way, the developer application is rate limited according to the rate configured in the predefined policy data by determining a number of tokens needed to process the API request. Further, varying the first number of tokens for the first API request and the second number of tokens for the second API request effectively changes the rate limit for the developer application regardless of the replenish rate of the token bucket.

Further embodiments, features, and advantages of the invention, as well as the structure and operation of the various embodiments of the invention are described in detail below with reference to accompanying drawings.

BRIEF DESCRIPTION OF THE FIGURES

The accompanying drawings, which are incorporated herein and form a part of the specification, illustrate the present invention and, together with the description, further serve to explain the principles of the invention and to enable a person skilled in the pertinent art to make and use the invention.

The drawing in which an element first appears is typically indicated by the leftmost digit or digits in the corresponding reference number. In the drawings, like reference numbers may indicate identical or functionally similar elements.

DETAILED DESCRIPTION OF EMBODIMENTS

Embodiments enable configurable rate limiting of API accesses using static token buckets. In examples, a user, such as a developer, may configure a rate at which a developer application may access the API. In an embodiment, instead of altering the bucket size to configure the API rate limit, the number of tokens requested for each API request from the may vary. In this way, the server that manages the token buckets does not need to incorporate the added complexity that would result from enabling the user to alter the token buckets. This reduced complexity may improve performance. This and other embodiments are described below with reference to accompanying drawings.

Figure 1A:
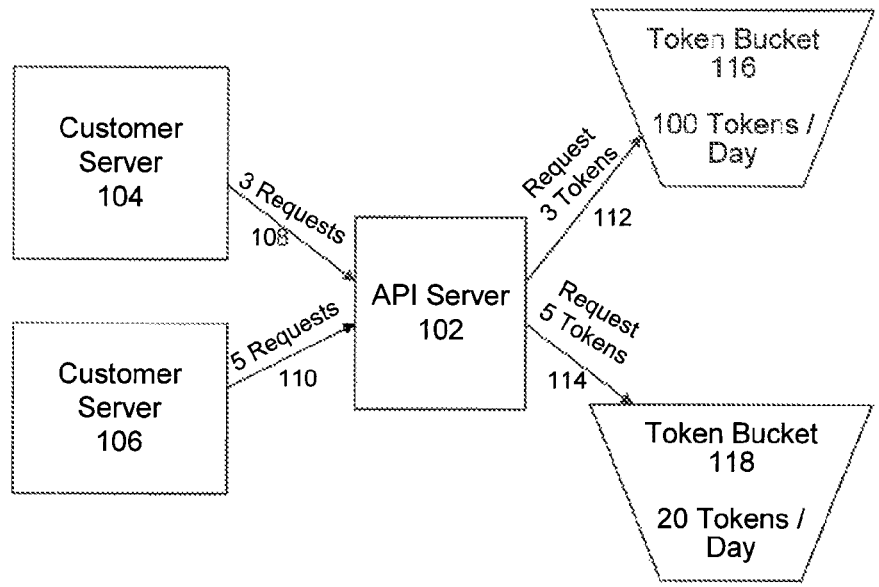
FIG. 1A is a diagram showing a system that enforces different rate limits for API requests by using token buckets of different sizes.

FIG. 1A shows a system 100 that enforces different rate limits for API requests by using token buckets of different sizes. In typical operation, system 100 requests only one token to process each request. System 100 includes an API server 102, customer servers 104 and 106, and token buckets 116 and 118. Each of these components is described in turn.

Customer servers 104 and 106 may have developer applications that utilize an API external to customer servers 104 and 106, such as an API provided by API server 102. In examples, customer servers 104 and 106 may provide websites that integrate services from the API server 102. For example, the customer servers 104 and 106 may provide websites that incorporate maps, search results, or advertisements retrieved from API server 102.

API server 102 may process any type of API. In examples, API server 102 may accept API requests over one or more networks, such as the Internet. The request may be formatted as a web service request utilizing, for example, extensible markup language (XML). Example applications that may be provided by API server 102 include, but are not limited to, a search API (e.g., a GOOGLE search API), a language translation API (e.g., a GOOGLE translator toolkit API), an API to retrieve advertisements (e.g., a GOOGLE ADSENSE API), geographic information system API (e.g., a GOOGLE maps API), a video player API (e.g., a YOUTUBE API), and a file server request for a file. API server 102 may service requests from developer applications located on remote servers, such as customer servers 104 and 106. In response to an API request, API server 102 may verify that a developer application has not exceeded its request quota and, if its quota is not exceeded, may service the request.

To verify that a developer application has not exceeded its request quota, API server 102 may implement policies using token buckets of varying size. API server 102 may maintain a bucket to track the usage of a developer application. The bucket may include a maximum number of tokens. During a particular time period, API server 102 may add a number tokens back to the bucket, as specified by a replenish rate of the bucket. However, each bucket may not be allowed to have more tokens than its maximum bucket size. Every time a request is made, API server 102 may attempt to remove a token from the bucket. If the bucket only includes zero tokens, API server 102 may deny an API request. To implement different policies for different developer applications, API server 102 may have token buckets with different sizes and replenish rates for each developer application, as illustrated with token buckets 116 and 118.

Token buckets 116 and 118 track API usage of developer applications at customer servers 104 and 106 respectively. As mentioned above, to process a request from a developer application, API server 102 may deduct a token from a token bucket for the developer application. For each request, API server 102 may deduct a single token. The diagram in FIG. 1A illustrates this in operation. Customer server 104 makes three API requests 108, and customer server 106 makes five API requests 110. To process these requests, API server 102 requests three tokens from token bucket 116 and five tokens from token bucket 118 respectively.

The developer applications may have subscribed to different levels of service for the API. For that reason, token buckets 116 and 118 have different replenish rates. Token bucket 116 has a replenish rate of 100 tokens per day, allowing an average of 100 requests per day, and token bucket 118 has a replenish rate of 20 tokens per day, allowing an average of 20 requests per day. In an example, the tokens may be added continuously. In that example, token bucket 116 may receive a new token every one hundredth of a day (or every 14.4 minutes), and token bucket 118 may receive a new token every one twentieth of a day (or every 1.2 hours).

While this approach has advantages, there are issues associated with varying the bucket size for different developers. For example, having different bucket sizes requires that tokens be added at different rates. This may require additional processing. Further, a user may want to change a service level for a developer application. This may also require additional processing. The additional processing may slow down verification of compliance with a developer's quota. API server 102 generally must verify that a developer application has not exceeded its quota before processing the API request and returning a result. Thus, slower verification may mean a slower response from API server 102 at customer servers 104 and 106.

At least in part to deal with these problems, embodiments do not vary the size of the token bucket to implement rate limits. Instead, embodiments vary the number of tokens requested from the token bucket. This embodiment is illustrated in FIG. 1B.

Figure 1B:
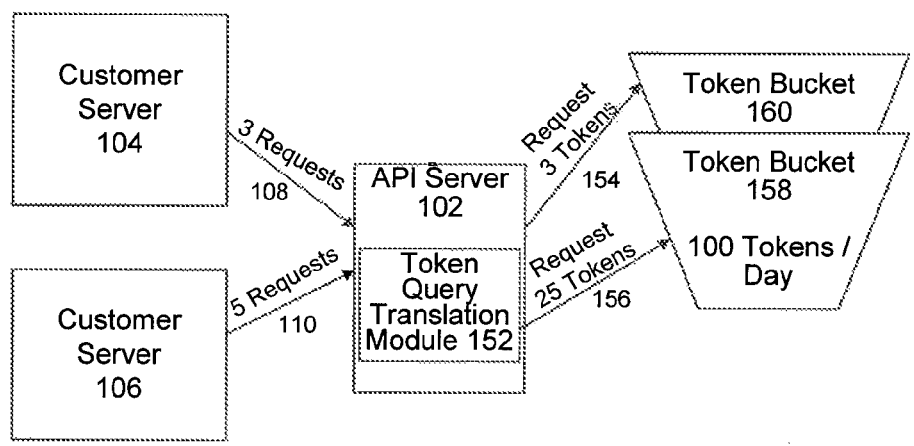
FIG. 1B is a diagram showing a system that enforces different rate limits for API requests by making requests of different sizes to token buckets of equal size, according to an embodiment.

FIG. 1B shows a system 150 that enforces different rate limits for API requests by making requests of different sizes to token buckets of equal size, according to an embodiment. Like system 100, system 150 has customer servers 104 and 106. Customer server 104 sends three requests 108 to API server 102, and customer server 104 sends five requests 110 to API server 102. Requests 108 and requests 110 may not necessarily occur at the same time.

In contrast to system 100, in system 150 API server 102 includes a token query translation module 152. Token query translation module 152 enforces a service level for a developer application by determining how many tokens needed to process an API request. Token query translation module 152 may, for example, use policy data to determine the number of requests allowed for a period. Token query translation module 152 may determine a number of requests by dividing the number of allowed requests by the replenish rate of the bucket. Token query translation module 152 may determine how many tokens are needed to process a single API request.

In system 150, API server 102 may have a token bucket for each developer application on customer server 104 and 106. Token bucket 158 may correspond to a developer application on customer server 104, and token bucket 160 may correspond to a developer application on customer server 106. Both token bucket 158 and 160 have the same replenish rate—100 tokens per day. Having the same replenish rate may improve efficiency.

Despite having different replenish rates for their token buckets, systems 100 and 150 enforce the same API rate limits. In both system 100 and 150, the developer application on customer server 104 is allowed 100 requests per day, and the developer application on customer server 106 is allowed 20 requests per day. Because the replenish rate for token bucket 160 is the same as the API request rate for customer server 104, token query translation module 152 makes a request 154 to deduct one token to process each of the three API requests.

However, because the replenish rate for token bucket 160 (100 tokens/day) is larger than API request rate for customer server 104 (20 request/day), token query translation module 152 must request more than one token for each request. Specifically, to enforce the 20 request per day rate limit, token query translation module 152 must request five tokens for each API request. To service five API requests 110, token query translation module 152 makes request(s) 156 to deduct 25 tokens from token bucket 158. In this way, token bucket query translation module 152 effectively simulates a bucket with a replenish rate different from the rate of token bucket 158.

In the example in system 150, the API rate limit of customer server 106 (20/day) is a factor of the replenish rate of token bucket 158 (100/day). However, the same principle may apply when dividing the replenish rate by the API rate limit results in a remainder. In that embodiment, token query translation module 152 may divide the replenish rate by the API rate and round down. In other words, token query translation module 152 may determine the quotient of the replenish rate into the API rate and take the floor of the quotient.

For example, if the API rate limit was 30 requests per day, token query translation module 152 may divide the 100/day replenish rate by the 30/day API rate limit and round down the remaining fractional portion (floor(100/30)). Thus, token query translation module 152 would request three (3) tokens for each API request. However, due to a rounding error, this would effectively allow the 33 requests per day, exceeding the policy limit of 30 requests/day. However, the risk of allowing a few extra requests may be outweighed by the efficiency gains of having a constant bucket replenish rate.

Further, the rounding error may be reduced by increasing the ratio of the bucket replenish rate to the API rate limit. For example, if the bucket replenish rate is 1,000,000 times the maximum API rate limit, API server 102 may allow at most (the API rate limit)*1.000001 requests. In this way, potential rounding inaccuracies are reduced. Reducing rounding inaccuracies is discussed in further detail below.

Simulating buckets in this way may be particularly advantageous when the actual token buckets are managed by a server separate from token query translation module 152. In this way, the processing necessary to determine how many tokens are needed to process an API request may be separate from, and may not interrupt, the processing necessary to manage the token buckets. An example of this embodiment is illustrated in FIG. 2.

Figure 2:
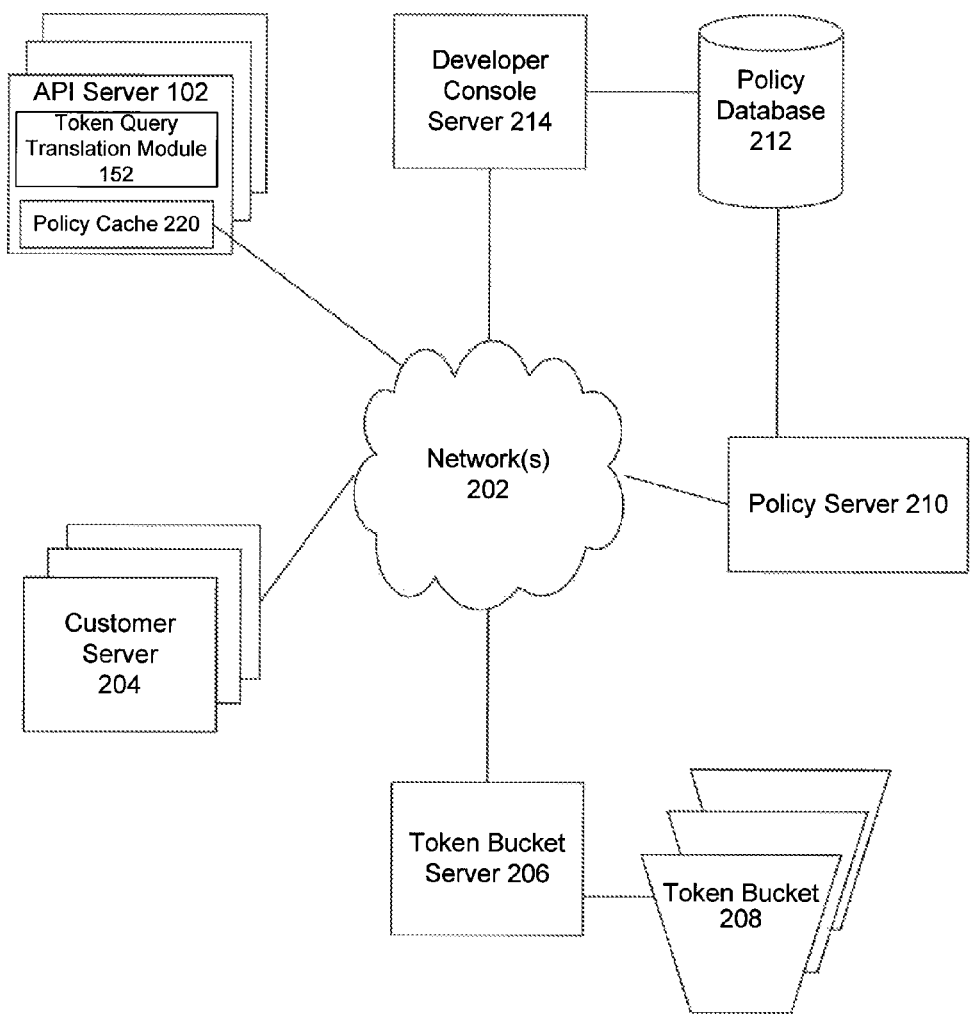
FIG. 2 is a diagram showing a system that includes a policy server for configuring API rate limits, according to an embodiment.

FIG. 2 shows a system 200 that includes a policy server for configuring API rate limits, according to an embodiment. Similar to system 150 in FIG. 1B, system 200 includes API server 102 with token query translation module 152. In system 200, API server 102 further includes a policy cache 220. Moreover, system 200 includes customer servers 204, a token bucket server 206, a policy server 210, and a developer console server 214 coupled to one or more networks 202, such as the Internet. Each of these components is described generally below with respect to FIG. 2 and in more detail with respect to FIGS. 3-5.

Developer console server 214 enables a user to configure the policy data, including rate limits, for the developer application. Developer console server 214 may, for example, be a web server that offers an interface that enables a user to register a new developer application. The interface may also enable a user to alter API request rate limits for the developer application. Based on the user's selections, the developer console server 214 may send policy data to a policy database 212 for storage.

Once an API request policy for a developer application is configured, the developer application may be deployed for use on the customer server 204. Multiple customer servers 204 are shown in system 200 to illustrate that an API may be used by many different developer applications. With the developer application deployed, the developer application may send a request to API server 102 to invoke the API. Token query translation module 152 determines a number of tokens needed to process the API request based on a rate configured in predefined policy data for the developer application and a replenish rate of the token bucket. As described above, the number of tokens may correspond inversely to the rate configured in the predefined policy data and may correspond to the replenish rate of the token bucket. To retrieve the policy data, token query translation module 152 may first check policy cache 220.

Policy cache 220 caches policy data. If policy data for a developer application is not stored in policy cache 220, token query translation module 152 may request the policy data from policy server 210. Once policy server 210 retrieves the data from policy database 212 and returns the data, token query translation module 152 may use the policy data to determine how many tokens to request and may store the policy data in policy cache 220. In an embodiment, policy data in policy cache 220 may expire after a particular time period, such as five minutes. In this way, the data in policy cache 220 is never more than approximately five minutes out of sync with data in policy database 212.

Once token query translation module 152 determines how many tokens are needed to process the request, API server 102 requests the needed tokens from token bucket server 206. In response to the request, token bucket server 206 identifies which token bucket 208 corresponds to the request. Then, token bucket server 206 instructs API server 102 to process the API request if the number of tokens in the identified token bucket 208 exceeds the number of tokens in the request. Further, token bucket server 206 reduces the number of tokens in the identified token bucket 208 by the number of tokens needed to process the API request. In this way, token bucket server 206 uses token buckets 208 to rate limit API requests from a developer application.

Figure 3:
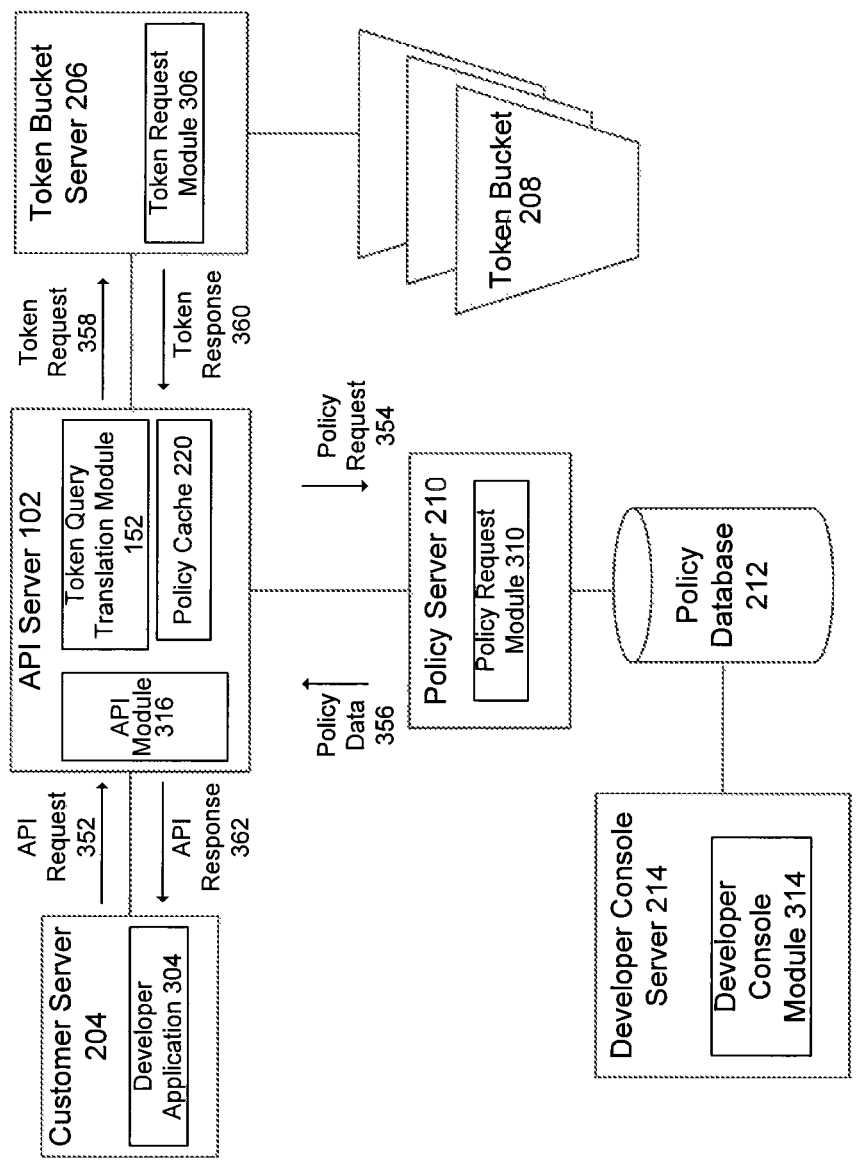
FIG. 3 is a diagram showing the system of FIG. 2 in greater detail.

FIG. 3 shows the components of system 200 in greater detail and further illustrates exemplary data flows between components of system 200. FIG. 3 shows a system 300. Similar to system 200 in FIG. 2, system 300 includes customer server 204, API server 102, token query translation module 152, API module 316, policy cache 220, token bucket server 206, token buckets 208, policy server 210, and developer console server 214. System 300 further shows that: customer server 204 includes a developer application 304; API server 102 includes an API module 316; policy server 210 includes a policy request module 310; and developer console server 214 includes a developer console module 314. Each of these components are described in turn, and their operation is described with respect to FIGS. 4-5.

Figure 4:
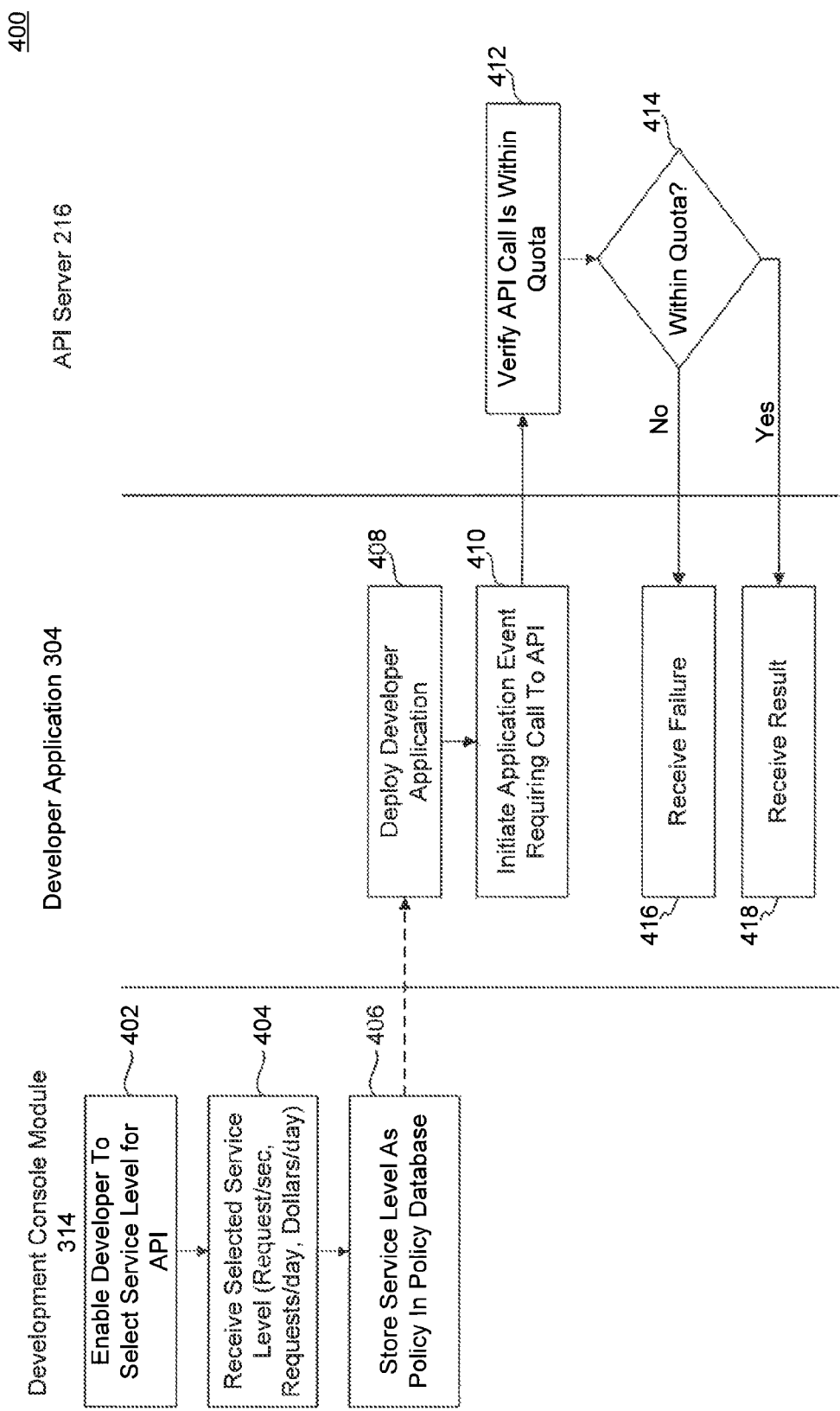
FIG. 4 is a diagram showing a method for configuring and enforcing rate limits, which may be used in operation of the system of FIG. 2.

FIG. 4 shows a method 400 for configuring and enforcing rate limits, which may be used in operation of the system 300. Although method 400 is described with respect to components of system 300 for illustrative purposes, it is not limited thereto.

Developer console module 314 may enable a user to configure the policy data, including rate limits, for the developer application at step 402. Developer console module 314 may offer an interface that enables a user to register a new developer application and to alter API request rate limits for the developer application. The interface may enable a user to select a service level. Each service level may have three associated rate limits—requests per second, request per day, and dollars per day. Different types of API requests may have different dollar values. At step 404, developer console module 314 receives the developer's service level selection for the developer application's use of the API.

Once developer console module 314 receives the user's service level selection, developer console module 314 stores policy data, including the API rate limits, in policy database 212. As mentioned above, in some embodiments, there may be three different rate limits associated with an API—requests per second, request per day, and dollars per day. In another embodiment, a rate limit associated with an end user of a developer application may also be imposed. Each rate may be stored as policy data for the developer application in policy database.

In the event that the user is registering a new developer application, such as developer application 304, to use the API, developer console module 314 may instantiate new token buckets 208 for the developer application. The different replenish rates may vary exponentially (such as in orders of 10, e.g., $10^6$, $10^7$, $10^8$, etc.) to simulate buckets of different replenish rates. In an embodiment, developer console module 314 may alter a size (as opposed to a replenish rate) of the token buckets 208 corresponding to developer application 304. In an example, developer console module 314 may set the size of token buckets 208 to be a factor of the replenish rate. For example, developer console module 314 may set the size of token buckets 208 to be 10 times the bucket's corresponding replenish rate. To avoid having to alter token buckets 208 each time a developer changes service level, the token buckets having a variety of different sizes (e.g., $10^6$, $10^7$, $10^8$) may be instantiated in advance.

once a user has used the developer console module 314 to register developer application 304, the user may deploy developer application 304 on customer server 204. As mentioned above, developer application 304 may incorporate maps, search results, or advertisements retrieved from API server 102. In an embodiment, developer application 304 may call the API from customer server 204. For example, developer application 304 may run within a web server and call the API to determine what content to generate to respond to an HTTP request. In another embodiment, developer application 304 may be a client-side script or program, such as a Flash file, a mobile application, or a JavaScript program (e.g., an Asynchronous JavaScript and XML (AJAX) program). In that embodiment, developer application 304 may be downloaded to a client device, and developer application 304 may make API requests from the client device.

Irrespective of where the request is made from, an event of developer application 304 is initiated at step 410, requiring call to the API. Developer application 304 sends an API request 352 to API server 102. As mentioned above, API request 352 may be formatted as an HTTP or web service request.

On receipt of API request 352, API server 102 may verify that API request 352 is within a quota for developer application 304 at step 412. Step 412 is described in more detail with respect to FIG. 5. If API request 352 is within the allowed quota at decision block 414, API module 316 may process API request 352 and send an API response 362 back to developer application 304 at step 418. If API request 352 is not within the allowed quota at decision block 414, API module 316 may process API request 352 and send an API response 362 back to developer application 304 at step 418.

Figure 5:
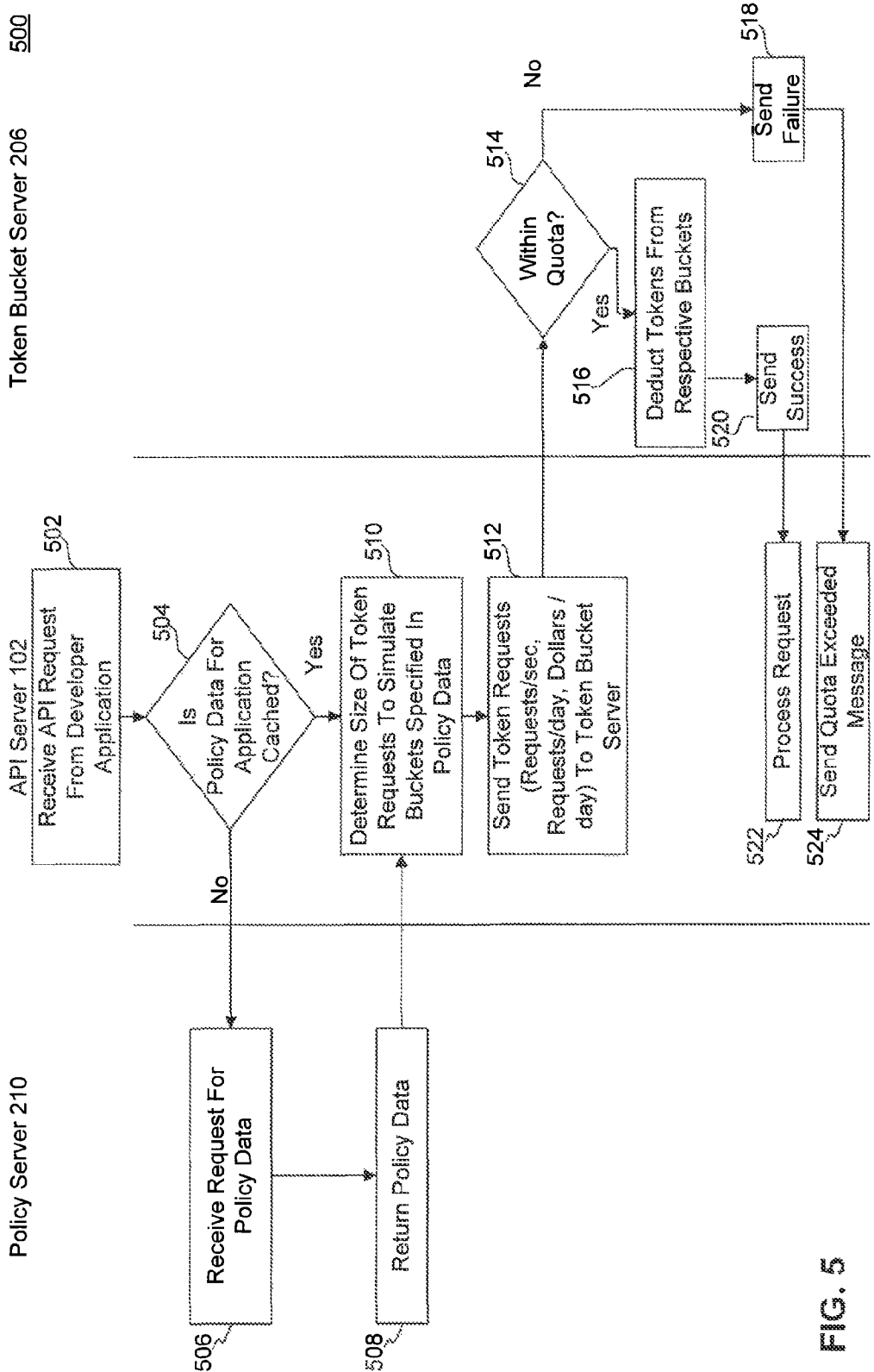
FIG. 5 is a diagram showing a method for enforcing rate limits, which may be used in operation of the system of FIG. 2.

FIG. 5 shows a method 500 for enforcing rate limits, which may be used in operation of system 300. Although method 500 is described with respect to components of system 300 for illustrative purposes, it is not limited thereto.

Method 500 begins at a step 502 when API server 102 receives an API request 352 from a developer application. In addition to any parameters necessary to use the API, API request 352 may include an identifier for the developer application. In some embodiments, API request 352 may also include an identifier for an end user of the developer application.

Once API request 352 is received, API server 102 checks to see if policy data needed to verify that API request 352 complies with request quotas is cached locally at step 504. In an example, API server 102 may query policy cache 220 using the developer application identifier received in API request 352. If policy cache 220 has the policy data, method 500 proceeds to step 510. Otherwise, method 500 proceeds to step 506 to send a policy request 354 to policy server 210.

At step 506, policy request module 310 receives policy request 354. Policy request module 310 retrieves policy data for developer application from policy database 212 and replies to policy request 354 with policy data 356. Policy data 356 may include various API rate limits for developer application 304. For example, as mentioned above, policy data 356 may include rate limits for requests/day, requests/second, and dollars/day. In a further embodiment, policy request 354 may identify an end user of developer application 304, and policy data 356 may include a rate limit for that specific end user (e.g., requests by end user X/day). For each rate limit, policy data 356 may be used to compute an associated bucket size. As set forth below, the associated bucket size may be used to identify which of several predefined token buckets 208 may be used to rate limit developer application 304. At step 508, policy server 210 returns policy data 356 to API server 102, and API server 102 caches policy data 356.

After receiving policy data (either from policy server 210 or from policy cache 220), token query translation module 510 determines the token requests needed to enforce the policy data's rate limits at step 510. As described above, token query translation module 510 determines the number of tokens to simulate buckets as set forth in the policy data. To simulate token buckets as specified by the policy data, the number of tokens determined by token query translation module 152 corresponds to a replenish rate of the corresponding actual token bucket, and corresponds inversely to the API rate. As mentioned above, in an embodiment the policy data may include multiple API rate limits (e.g., requests/day, requests/second, and dollars/day).

After determining the number of tokens needed to enforce each API rate limit, token query translation module 152 assembles and sends a token request 258 to token bucket server 206. For each API rate limit in the policy data, token request 258 may identify a token bucket 208 and a number of tokens to request from the identified token bucket 208. As mentioned above, in an embodiment, each API rate limit may have an number of predefined buckets of varying size (e.g., $10^6$, $10^7$, $10^8$, etc.) In identifying a token bucket 208, token request 358 may indicate a size of the bucket to use. Thus, token request 358 may identify the developer application 304, an API requested by developer application 304 and, for each type of API rate limit, a number of tokens to request and a size of the token bucket. An example token request 358 for a developer application "Realtor" and an API "Maps" may be formatted as follows:

Developer="Realtor"; API="Maps"; Bucket Type="Request/Day"; Size=$10^9$; Tokens: 30

Developer="Realtor"; API="Maps"; Bucket Type="Request/Second"; Size=$10^8$; Tokens: 400

Developer="Realtor"; API="Maps"; Bucket Type="Dollars/Day"; Size=$10^{10}$; Tokens: 6500.

Once token request 358 is received by token bucket server 206, token request module 306 determines whether the token bucket(s) specified in token request 358 have sufficient tokens at step 514. If the specified token bucket(s) have sufficient tokens, token request module 306 may deduct the needed tokens from the specified token bucket 208 at step 516, and may send a success notification in a token response 360 at step 520. The success notification indicates that a rate limit for developer application 304 has not been exceeded. In contrast, if any of the specified token buckets have insufficient tokens, token request module 306 may send a failure notification in token response 360. The failure notification indicates that a rate limit for developer application 304 has been exceeded.

In an example, token request module 306 may receive a token request 358 formatted as illustrated above. In that example, token request module 306 would identify three token buckets from token buckets 208. The first token bucket tracks the number of "Maps" API requests from the "Realtor" developer application per day and has a maximum bucket size of $10^9$ tokens. From the first token bucket, token request module 306 would deduct 30 tokens. The second token bucket tracks the number of "Maps" API requests from the "Realtor" developer application per second and has a maximum bucket size of $10^8$ tokens. From the second token bucket, token request module 306 would deduct 400 tokens. Finally, the third token bucket tracks the number of dollars worth of "Maps" API usage from the "Realtor" developer application per day and has a maximum bucket size of $10^{10}$ tokens. From the third token bucket, token request module 306 would deduct 6500 tokens. Token request module 306 would send a success notification at step 520 only if each of the three token buckets had sufficient tokens (i.e., the first token bucket has at least 30 tokens; the second token bucket has at least 400 tokens; and the third token bucket has at least 6500 tokens.)

In response to a success notification in token response 360, an API module 316 may process API request 352 to provide API response 362.

In response to a failure notification in token response 360, an API module 316 may send message in API response 362 indicating that the developer application 304's quota had been exceeded.

In this way, system 300 rate limits API calls from developer application 304 in an easily configurable way. However, the bulk of the processing to handle the configuration occurs outside of token bucket server 206, and, therefore, does not consume token bucket server 206's computing resources, such as processor time and memory. As result, response times for token bucket server 206 may be improved. As result of the improved response times for token bucket server 206, API server 102 may respond to API requests more quickly as well.

Figure 6:
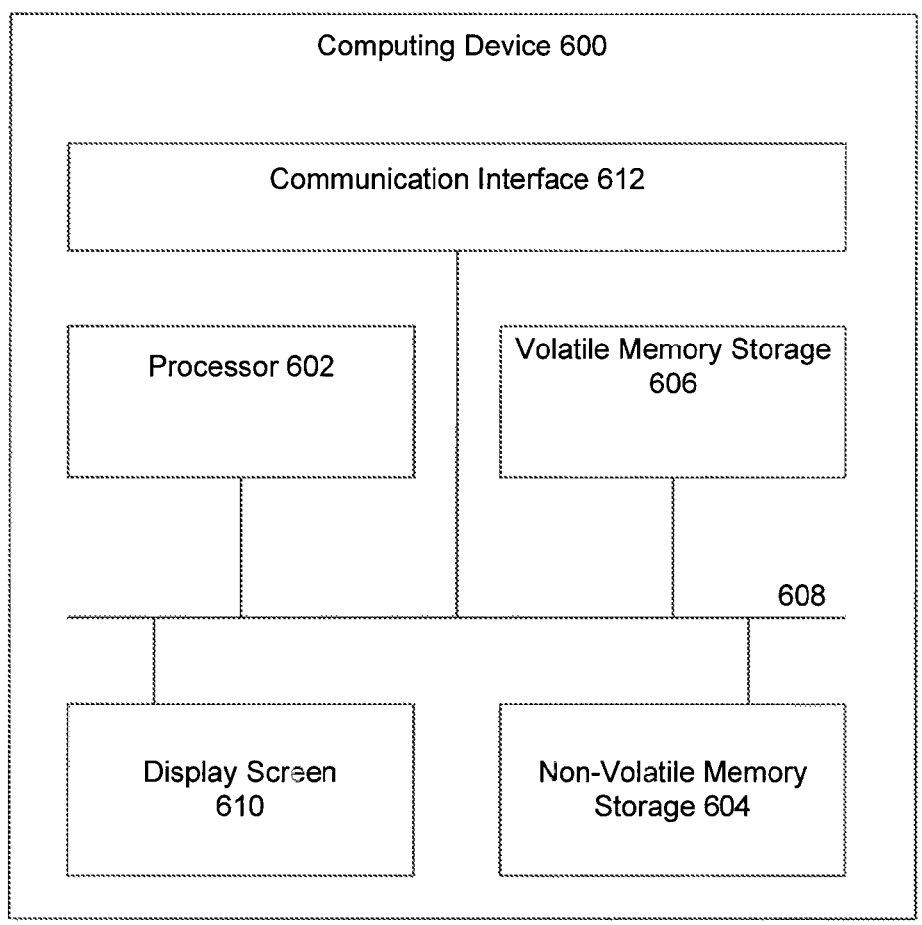
FIG. 6 is a diagram illustrating an example computing device, which may be used in embodiments.

FIG. 6 is an example computer system 600 in which embodiments of the present invention, or portions thereof, may by implemented as computer-readable code. For example, the components or modules of system 300 may be implemented in one or more computer systems 600 using hardware, software, firmware, tangible computer-readable media having instructions stored thereon, or a combination thereof and may be implemented in one or more computer systems or other processing systems. Modules and components in FIGS. 1-3 may be embodied in hardware, software, or any combination thereof.

Each of customer server 204, API server 102, token bucket server 206, policy server 210, and developer console server 214 may be implemented on any computing device. Such computing device may include one or more processors 602, one or more non-volatile storage mediums 604, one or more memory devices 606, a communication infrastructure 608, a display screen 610 and a communication interface 612. Processors 602 may include any conventional or special purpose processor, including, but not limited to, digital signal processor (DSP), field programmable gate array (FPGA), and application specific integrated circuit (ASIC). Non-volatile storage 604 may include one or more of a hard disk drive, flash memory, and like devices that may store computer program instructions and data on computer-readable media. One or more of non-volatile storage device 604 may be a removable storage device. Memory devices 606 may include one or more volatile memory devices such as but not limited to, random access memory. Communication infrastructure 608 may include one or more device interconnection buses such as Ethernet, Peripheral Component Interconnect (PCI), and the like. The computing device may also have multiple processors and multiple shared or separate memory components. For example, the computing device may be a clustered computing environment or server farm.

Typically, computer instructions are executed using one or more processors 602 and can be stored in non-volatile storage medium 604 or memory devices 606.

Display screen 610 allows results of the computer operations to be displayed to a user or an application developer.

Communication interface 612 allows software and data to be transferred between computer system 600 and external devices. Communication interface 612 may include a modem, a network interface (such as an Ethernet card), a communications port, a PCMCIA slot and card, or the like. Software and data transferred via communication interface 612 may be in the form of signals, which may be electronic, electromagnetic, optical, or other signals capable of being received by communication interface 612. These signals may be provided to communication interface 612 via a communications path. The communications path carries signals and may be implemented using wire or cable, fiber optics, a phone line, a cellular phone link, an RF link or other communications channels.

Embodiments also may be directed to computer program products comprising software stored on any computer-useable medium. Such software, when executed in one or more data processing device, causes a data processing device(s) to operate as described herein. Embodiments of the invention employ any computer-useable or readable medium. Examples of computer-useable mediums include, but are not limited to, primary storage devices (e.g., any type of random access memory), secondary storage devices (e.g., hard drives, floppy disks, CD ROMS, ZIP disks, tapes, magnetic storage devices, and optical storage devices, MEMS, nanotechnological storage device, etc.).

Additional Examples and Alternatives

As described above, to determine the number of tokens to request R for an API rate limit of N and a replenish rate of S, the following equation may be used: R=floor(S/N). However, due to rounding errors, this approach may allow more requests than is supposed to be allowed by rate limit R. This inaccuracy in allowing extra requests is defined by p in the equation S<NpR, where p is just greater than 1. In this equation, fewer than Np requests will succeed.

As described above, the inaccuracy may be reduced by increasing the ratio of the bucket replenish rate to the API rate limit. If an error rate of p=1.00001 is acceptable, that error rate may be satisfied by $S \geq 10^5 N$. This is shown by the following equations: $R \geq 10^5 \rightarrow Rp \geq R+1 \rightarrow RpN >= (R+1)N > S$ (the last step since S/N<floor(S/N)+1).

In an alternative embodiment, to determine the number of tokens to request R, S/N may not always be rounded down. To determine R, S/N may be rounded up some of the time and rounded down other times. As an example, S=100/N=30 may be computed using a random number generator to return three 70% of the time and to return four 30% of the time, so that the average return value is 3.3333. This embodiment may include a similar set of ascending bucket sizes, and some Chernoff bound techniques, to guarantee accurate performance in all cases. While this method may reduce the issues with allowing extra requests, its accuracy may vary widely across cases, and it may increase the processing requirements to make the token request. The increased processing requirements may slow API response time.

In examples above, one or three buckets are generally used for each API request. However, a person of skill in the art would recognize that embodiments are not limited thereto. Other numbers of buckets may be used, and those buckets may track different characteristics.

Finally, example embodiments above refer to API requests. However, embodiments are not limited thereto. A person of skill in the art would recognize that the rate limiting disclosed herein may be applied to other types of network requests.

The Summary and Abstract sections may set forth one or more but not all exemplary embodiments of the present invention as contemplated by the inventor(s), and thus, are not intended to limit the present invention and the appended claims in any way.

The present invention has been described above with the aid of functional building blocks illustrating the implementation of specified functions and relationships thereof. The boundaries of these functional building blocks have been arbitrarily defined herein for the convenience of the description. Alternate boundaries can be defined so long as the specified functions and relationships thereof are appropriately performed.

The foregoing description of the specific embodiments will so fully reveal the general nature of the invention that others can, by applying knowledge within the skill of the art, readily modify and/or adapt for various applications such specific embodiments, without undue experimentation, without departing from the general concept of the present invention. Therefore, such adaptations and modifications are intended to be within the meaning and range of equivalents of the disclosed embodiments, based on the teaching and guidance presented herein. It is to be understood that the phraseology or terminology herein is for the purpose of description and not of limitation, such that the terminology or phraseology of the present specification is to be interpreted by the skilled artisan in light of the teachings and guidance.

The breadth and scope of the present invention should not be limited by any of the above-described exemplary embodiments, but should be defined only in accordance with the following claims and their equivalents.

What is claimed is:

1. A computer-implemented method for rate limiting application programming interface (API) requests, comprising:
   (a) receiving, at an API server, an API request from a developer application;
   (b) determining a number of tokens needed to process the API request based on a first rate configured in predefined policy data for the developer application and a first replenish rate of a first token bucket to rate limit API requests from the developer application, the number of tokens inversely corresponding to the first rate configured in the predefined policy data;
   in response to receipt of the API request:
   (c) reducing a number of tokens in the first token bucket for the developer application by the number of tokens needed to process the API request determined in (b); and
   (d) if the number of tokens in the first token bucket for the developer application exceeds the number of tokens needed to process the API request determined in (b), processing the API request to return a response to the API request to the developer application, whereby the developer application is rate limited according to the first rate configured in the predefined policy data by determining a number of tokens needed to process the API request, wherein the first rate configured in the predefined policy data specifies a number of API requests allowed from the developer application for a first time period, and the first token bucket tracks the API requests from the developer application in the first time period; and (e) repeating steps (b)-(c) for a rate configured in the predefined policy data that specifies a number of API requests allowed from the developer application for a second time period different from the first time period, and for a second token bucket that tracks the API requests from the developer application in the second time period.

2. The method of claim 1, further comprising:
(e) enabling a user to configure the rate configured in the predefined policy data for the developer application.

3. The method of claim 1, wherein the determining (b) comprises determining a quotient of the replenish rate of the first token bucket divided by the rate configured in the predefined policy data.

4. The method of claim 3, wherein the determining (b) further comprises rounding the quotient down to a next lowest integer to determine the number of tokens needed to process the API request.

5. The method of claim 1, further comprising:
(e) determining whether the predefined policy data is cached on the API server; and
(f) retrieving the predefined policy data from a policy server, separate from the API server, if the policy data is not cached on the API server.

6. The method of claim 1, further comprising:
(f) repeating steps (b)-(c) for a rate configured in the predefined policy data that specifies a value worth of API services for a third time period, and a third token bucket that tracks the value worth of API services from the developer application in the third time period.

7. The method of claim 6, wherein the processing (d) comprises processing the API request only if the first token bucket, the second token bucket and the third token bucket each have sufficient tokens to process the API request.

8. A system for rate limiting application programming interface (API) requests, comprising:
an API server that receives an API request from a developer application;
a first token bucket that tracks API requests from the developer application in a first time period;
a second token bucket that tracks API requests from the developer application in a second time period different from the first time period;
a token query translation module that determines a number of tokens needed to process the API request based on a first rate configured in predefined policy data for the developer application and a first replenish rate of the first token bucket, the number of tokens inversely corresponding to the first rate configured in the predefined policy data; and
a token request module that:
(i) instructs the API server to process the API request if a number of tokens in the first token bucket for the developer application exceeds the number of tokens needed to process the API request, and
(ii) reduces the number of tokens in the first token bucket for the developer application by the number of tokens needed to process the API request, whereby the developer application is rate limited according to the first rate configured in the predefined policy data by determining a number of tokens needed to process the API request, wherein the first rate configured in the predefined policy data specifies a number of API requests allowed from the developer application for the first time period; and wherein the token query translation module determines a second number of tokens needed to process the API request based on a second rate that specifies a number of API requests allowed from the developer application for the second time period a second replenish rate of the second token bucket.

9. The system of claim 8, further comprising:
a developer console module that enables a user to configure the first rate configured in the predefined policy data for the developer application.

10. The system of claim 8, wherein the token query translation module determines a quotient of the first replenish rate of the first token bucket divided by the first rate configured in the predefined policy data.

11. The system of claim 10, wherein the token query translation module rounds the result down to a next lowest integer to determine the number of tokens needed to process the API request.

12. The system of claim 8, further comprising a policy server, separate from the API server that provides policy data,
wherein the API server comprises a policy cache that caches policy data, and
wherein the token query translation module retrieves the predefined policy data from the policy server if the policy data for the developer application is not in the policy cache.

13. The system of claim 8, further comprising:
a third token bucket that tracks the value worth of API services from the developer application in a third time period,
wherein the token query translation module determines a third number of tokens needed to process the API request based on a rate that specifies a value worth of API services for the third time period and a replenish rate of the third token bucket.

14. The system of claim 13, wherein token request module instructs the API server to process the API request only if the first token bucket, the second token bucket and the third token bucket each have sufficient tokens to process the API request.

15. The system of claim 8, further comprising:
a token bucket server, separate from the API server, that implements the token request module, wherein the token bucket translation module is implemented on the API server.

16. The system of claim 15, wherein the token bucket server is implemented on at least one first computing device, and the API server is implemented at least one second computing device separate from the first computing device but coupled to the first computing device by one or more networks.

17. A computer-implemented method for rate limiting application programming interface (API) requests, comprising:
(a) receiving, at an API server, a first API request from a developer application;
(b) determining a first number of tokens needed to process the first API request based on a rate configured in predefined policy data for the developer application and a replenish rate of a token bucket to rate limit API requests from the developer application, the number of tokens inversely corresponding to the rate configured in the predefined policy data;

in response to receipt of the first API request:

(c) if a number of tokens in the token bucket for the developer application exceeds the first number of tokens needed to process the first API request determined in (b), processing the first API request to return a response to the first API request to the developer application; and (d) reducing the number of tokens in the token bucket for the developer application by the first number of tokens needed to process the first API request determined in (b);

(e) altering the rate configured in the predefined policy data for the developer application;

(f) receiving a second API request from the developer application;

(g) determining a second number of tokens needed to process the second API request based on the rate altered in (e) and the replenish rate of the token bucket, the second number of tokens differing from the first number of tokens determined in (b) and inversely corresponding to the rate altered in (e);

in response to the second API request:

(h) if the number of tokens in the token bucket for the developer application exceeds the second number of tokens needed to process the API request determined in (e), processing the second API request to return a result of the second API request to the developer application;

(i) reducing the number of tokens in the token bucket for the developer application by the second number of tokens determined in (g), whereby varying the first number of tokens for the first API request and the second number of tokens for the second API request effectively changes the rate limit for the developer application regardless of a replenish rate of the token bucket.

18. A system for rate limiting application programming interface (API) requests, comprising:

an API server that receives first and second API requests from a developer application; and a token query translation module that:

(i) determines a first number of tokens needed to process the first API request based on a first rate configured in predefined policy data for the developer application and a replenish rate of a token bucket, the number of tokens inversely corresponding to the first rate configured in the predefined policy data;

(ii) sends a first token request including the first number of tokens to a token bucket server that returns whether the token bucket has greater than the determined first number of tokens;

(iii) determines a second number of tokens needed to process the second API request based on a second rate configured in predefined policy data for the developer application and the replenish rate of the token bucket, the second number of tokens differing from the first number of tokens and inversely corresponding to the second rate configured in the predefined policy data; and (iv) sends a second token request including the second number of tokens to the token bucket server that returns whether the token bucket has greater than the determined second number of tokens, wherein the API server processes the first and second API requests to return a response to the developer application if the token bucket server indicates that the token bucket has greater than the determined first and second number of tokens, respectively.

19. A computer-implemented method for rate limiting network requests, comprising:

(a) receiving, at a server, a request from a developer application via a network;

(b) determining a number of tokens needed to process the network request based on a first rate configured in predefined policy data for the developer application and a first replenish rate of a first token bucket to rate limit requests from the developer application, the number of tokens inversely corresponding to the first rate configured in the predefined policy data;

in response to receipt of the network request:

(c) reducing a number of tokens in the first token bucket for the developer application by the number of tokens needed to process the network request determined in (b); and (d) if the number of tokens in the first token bucket for the developer application exceeds the number of tokens needed to process the request determined in (b), processing the request to return a response to the request to the developer application, whereby the developer application is rate limited according to the first rate configured in the predefined policy data by determining a number of tokens needed to process the network request, wherein the first rate configured in the predefined policy data specifies a number of network requests allowed from the developer application for a first time period, and the first token bucket tracks the network requests from the developer application in the first time period; and (e) repeating steps (b)-(c) for a rate configured in the predefined policy data that specifies a number of network requests allowed from the developer application for a second time period different from the first time period, and for a second token bucket that tracks the network requests from the developer application in the second time period.

20. A non-transitory computer-readable medium tangibly embodying a program of instructions executable by a computing device to rate limit application programming interface (API) requests, said method steps comprising:

(a) receiving, at an API server, an API request from a developer application;

(b) determining a number of tokens needed to process the API request based on a first rate configured in predefined policy data for the developer application and a first replenish rate of a first token bucket to rate limit API requests from the developer application, the number of tokens inversely corresponding to the first rate configured in the predefined policy data;

in response to receipt of the API request:

(c) reducing a number of tokens in the first token bucket for the developer application by the number of tokens needed to process the API request determined in (b); and (d) if the number of tokens in the first token bucket for the developer application exceeds the number of tokens needed to process the API request determined in (b), processing the API request to return a response to the API request to the developer application, whereby the developer application is rate limited according to the first rate configured in the predefined policy data by determining a number of tokens needed to process the API request, wherein the first rate configured in the predefined policy data specifies a number of API requests allowed from the developer application for a first time period, and the first token bucket tracks the API requests from the developer application in the first time period; and (e) repeating steps (b)-(c) for a rate configured in the predefined policy data that specifies a number of API requests allowed from the developer application for a second time period different from the first time period, and for a second token bucket that tracks the API requests from the developer application in the second time period.

* * * * *